March 22, 1966 J. B. KUCERA 3,241,841
BULK MATERIAL SCATTERING UNLOADER
Filed March 9, 1964 5 Sheets-Sheet 1

INVENTOR
JOSEPH B. KUCERA
BY
ATTORNEY

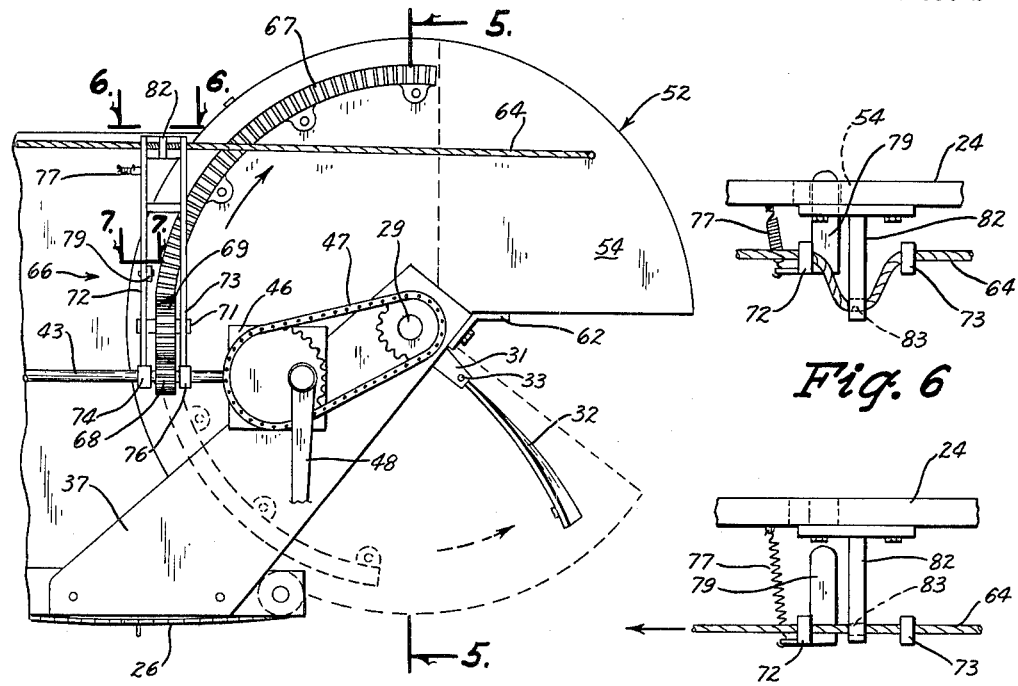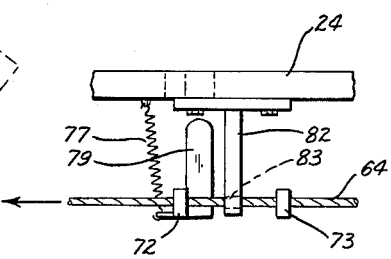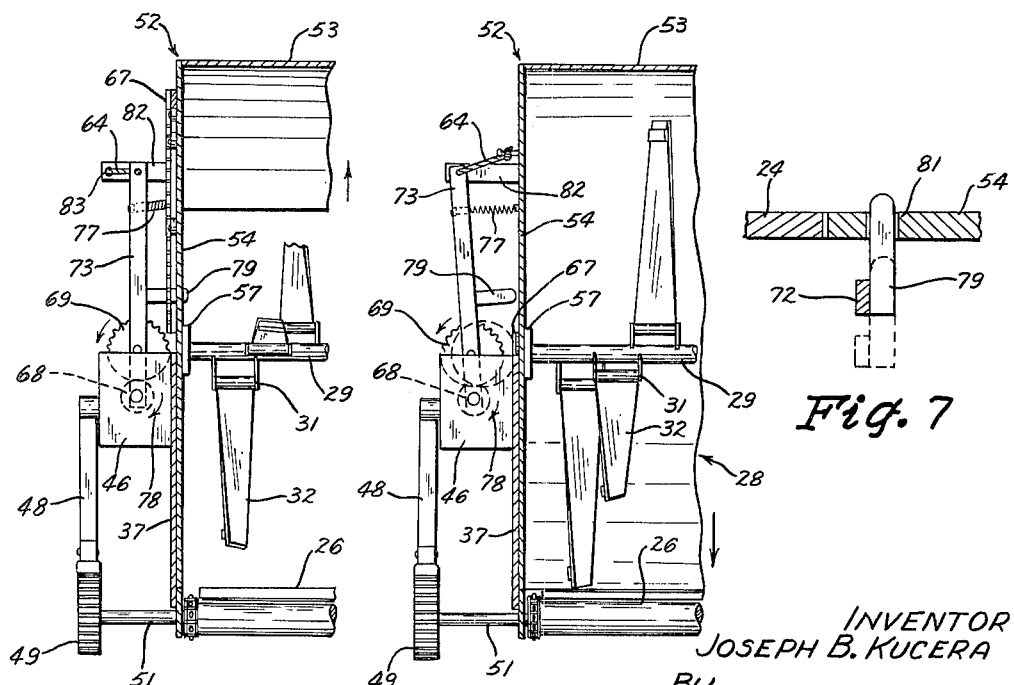

March 22, 1966  J. B. KUCERA  3,241,841
BULK MATERIAL SCATTERING UNLOADER

Filed March 9, 1964  5 Sheets-Sheet 3

INVENTOR
JOSEPH B. KUCERA
BY
Rudolph L. Lowell
ATTORNEY

March 22, 1966  J. B. KUCERA  3,241,841
BULK MATERIAL SCATTERING UNLOADER

Filed March 9, 1964

INVENTOR
JOSEPH B. KUCERA
BY
ATTORNEY

March 22, 1966 J. B. KUCERA 3,241,841
BULK MATERIAL SCATTERING UNLOADER
Filed March 9, 1964 5 Sheets-Sheet 5

INVENTOR
JOSEPH B. KUCERA
BY
Rudolph L. Lowell
ATTORNEY

United States Patent Office 3,241,841
Patented Mar. 22, 1966

3,241,841
BULK MATERIAL SCATTERING UNLOADER
Joseph B. Kucera, Traer, Iowa
Filed Mar. 9, 1964, Ser. No. 350,487
3 Claims. (Cl. 275—6)

This invention relates to a bulk material unloading machine and more particularly to a bulk material spreader vehicle having a flail or beater assembly and hood means selectively operable to function as a top cover for the flail assembly and as an end gate adjacent the flail assembly.

It is the object of this invention to provide a spreader vehicle with an improved end gate.

Another object of the invention is to provide a tractor drawn spreader vehicle having a power driven flail assembly and a flail assembly hood movable to a first position adjacent the top of the flail assembly and to a second position adjacent the forward side of the flail assembly.

A further object of the invention is to provide a dual purpose hood for the flail assembly of a bulk material spreader adapted to function as a top cover for the flail assembly and as an end gate adjacent the flail assembly.

Still a further object of the invention is to provide a bulk material unloading vehicle having a power driven beater assembly with a hood unit positionable in front of the beater assembly to function as an end gate preventing bulk material from being positioned in the working area of the beater assembly and operable to move in an upward direction when power is supplied to the beater assembly to expose the bulk material to the action of the moving beater assembly.

Another object of the invention is to provide a bulk material spreader having a power driven flail assembly and a pivotal flail assembly hood movable in response to the transmission of power to the flail assembly to a position adjacent the top sector of the flail assembly and manually movable to a position adjacent the forward sector of the flail assembly.

Still another object of the invention is to provide a bulk material spreader with an end gate attachment usable with existing spreader structure and operable in response to the transmission of power to the spreader assembly to move to an open position and manually movable to a closed position.

An additional object of the invention is to provide a rugged end gate for a bulk material spreader which is economical in construction and efficient and automatic in operation.

Further objects, features, and advantages of this invention will become apparent from the following description when taken in connection with the accompanying drawing in which:

FIG. 4 is an enlarged side view of the hood and drive mechanism for moving the hood from a gate or closed position to a shield or open position;

FIG. 5 is a fragmentary sectional view taken along the line 5—5 of FIG. 4 showing the open position of the hood;

FIG. 6 is an enlarged plan view taken along the line 6—6 of FIG. 4 showing the engaged position of the drive mechanism;

FIG. 7 is an enlarged sectional view taken along the line 7—7 of FIG. 4;

FIG. 8 is a plan view similar to FIG. 6 showing the disengaged position of the drive mechanism;

FIG. 9 is a view similar to FIG. 5 showing the disengaged position of the drive mechanism and the closed position of the hood;

Figure 1:
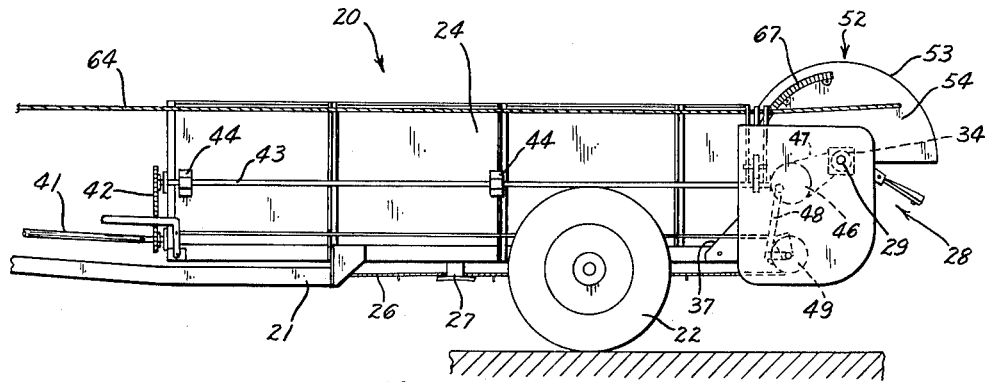
FIG. 1 is a side view of a flail spreader having a movable hood positioned adjacent the flail assembly.

Referring to the drawing and particularly to FIG. 1, the bulk material unloading machine of this invention is indicated generally at 20 and is illustrated as a two-wheel trailer-type vehicle. The machine 20 has a frame and axle assembly 21 supported above the ground by a pair of wheels 22 and 23. A rectangular box 24 having an open top and rear end is attached to the top of the frame and axle assembly 21 and is positioned between the wheels 22 and 23. An endless conveyer unit 26 is positioned in the box 24 and extends along the bottom thereof. The conveyer unit 26 moves longitudinally of the box 24 and carries bulk material positioned in the box toward the rear end thereof. The lower section of the conveyer unit 26 travels under the box 24 and is supported by guides 27 secured to the frame 21. The guides 27 in addition to supporting a long section of the conveyer also function to align the conveyer under the box 24.

Extended transversely across the rear end section of the box 24 is a beater or flail assembly 28 comprising a transverse shaft 29 having a plurality of radially extended rigid arms 31. Pivotally mounted to the outer sections of the arms 31 are flail or hammer units 32. Pins 33 extended substantially parallel to the shaft 29 pivotally connect the arms 31 with the hammer units 32. The opposite end sections of the shaft 29 are rotatably carried in bearings 34 and 36 fastened to rearwardly projected side plates 37 and 38, respectively. The plates 37 and 38 are part of the frame and axle assembly 21 and are secured to opposite sides of the rear sections thereof. The shaft 29 is carried in the plates 37 and 38 so as to position the ends of the hammer units 32 in a contiguous relationship with respect to the end of the bottom of the box 24 as depicted in FIG. 3.

Figure 3:
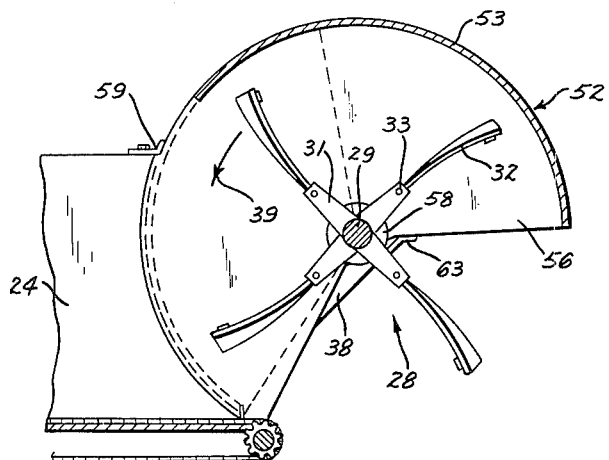
FIG. 3 is an enlarged sectional view taken along the line 3—3 of FIG. 2.

The flail assembly 28 is power driven and rotates in the direction of the arrow 39 shown in FIG. 3 to remove bulk material from the rear section of the box 24 in a downward and rearward direction. Referring to FIGS. 1 and 4, it is seen that the flail assembly 28 and the conveyor 26 are power driven from the rear power take-off of a tractor (not shown) by a shaft 41. A chain 42 connects the shaft 41 with a shaft 43 rotatably mounted on the side of the box 24 by bearings 44 with the rear end of the shaft being extended into a power transmission unit 46. A chain 47 couples the power transmission unit 46 to the flail assembly shaft 29. A ratchet arm 48 couples the power transmission unit 46 to the conveyor unit 26.

As shown in FIG. 5, the ratchet arm 48 is in driving engagement with a ratchet gear 49 connected to the drive shaft 51 for the conveyor unit 26. When the power transmission unit 46 is supplied with power the flail assembly 28 operates simultaneously with the conveyor unit 26 to discharge the bulk material from the box in a rearwardly and downwardly direction.

A hood indicated generally at 52 (FIG. 3) is positioned over the top sector of the flail assembly 28 and functions as a shield to deflect downwardly any of the bulk material that may be thrown upwardly by the flail assembly 28. The hood 52 has an arcuate top wall 53 with a circumferential length of approximately one hundred and forty degrees and side plates 54 and 56 secured to the opposite ends of the top wall 53. The side plates 54 and 56 are in longitudinal alignment with the side walls of the box 24 and are of a sector-shape corresponding to substantially two-thirds of a circle. Bearings 57 and 58 (FIG. 2) secured to the side plates 54 and 56, respectively, rotatably mount the hood 52 on the opposite end sections of the flail assembly shaft 29. The bearings 57 and 58 are positioned inside of and adjacent to the bearings 34 and 36 which mount the shaft 29 on the frame plates 37 and 38.

Figure 2:
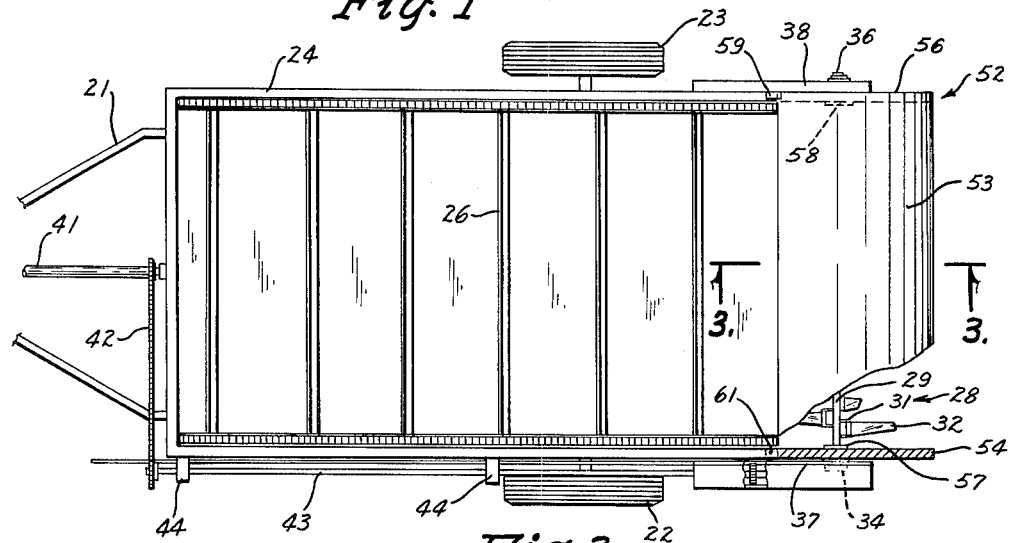
FIG. 2 is a plan view of FIG. 1 with a portion of the hood broken away to illustrate the flail assembly.

As shown in FIG. 3, the rear edge of a side wall of the box 24 is of an arcuate contour to accommodate the adjacent peripheral portion of the side plate 56. It is to be understood that the side plate 54 is similarly constructed and arranged relative to its corresponding side wall of the box 24. A scraper 57 of resilient material is secured on the top edge of the side wall of the box 24 and engages the peripheral portion of the side plate 56 to remove bulk material therefrom. The scraper 57 functions to minimize the amount of bulk material which may be carried by the side plate 56 into the space between the adjacent peripheral portions of the side plate 56 and rear edge of the side wall of the box 24. As shown in FIG. 2, a scraper 61 is secured to the opposite side wall of the box 24 and engages the peripheral surface of the side plate 54.

The hood 52 rotates on the axle 29 to open and close the rear end of the box 24. As shown in full lines in FIG. 3, the hood 52 is in an open or shielding position and as shown in broken lines the hood is in a closed or end gate position. A pair of fixed stops 62 and 63 secured to the plates 37 and 38 are engageable with the hood side plates 54 and 56 to limit the rotational movement of the hood. When the side plates 54 and 56 engage the stops 62 and 63 as shown in FIGS. 3 and 4 the hood 52 is in the open position.

The hood 52 is moved from the open position to the closed position by applying a pulling force on a cable or rope 64 as described hereinafter in detail. The cable 64 is secured at one end to the hood side plate 54 and extends along one side wall of the box 24. The opposite end of the cable is attached to the tractor in a place where it is readily accessible to the tractor operator. As indicated in broken lines in FIG. 3, when the hood 52 is in a closed position the forward edge of the top wall 53 engages the bottom of the box 24 so that the hood 52 functions as an end gate for the box. When the hood 52 is in the closed position bulk material may be indiscriminately placed in the box 24, out of the path of rotational movement of the flail assembly 28.

The hood 52 is moved from the closed position to the open position by a drive mechanism indicated generally at 66 in FIG. 4. The drive mechanism 66 comprises an arcuate-shaped rack 67 secured to the hood side plate 54 adjacent the periphery thereof. The drive shaft 43 is coupled to the rack 67 by a small drive gear 68 positioned on the shaft 43 and a relatively larger driven gear 69 positioned in meshing engagement with the rack 67 and the drive gear 68. The driven gear 69 is rotatably mounted on a pin 71 secured at its opposite ends to a pair of spaced upright parallel members or levers 72 and 73. The lower sections of the lever members 72 and 73 are secured to bearings 74 and 76 positioned about the shaft 43 on opposite sides of the drive gear 68. Since the pin 71 extends substantially parallel to the shaft 43 the gears 68 and 69 are held in a continuous driving relationship.

A spring 77 secured to the upper section of the member 72 and to the box 24 biases the gear 69 into engagement with the rack 67 and thus provides a driving connection between the shaft 43 and the hood 52, as shown in broken lines in FIG. 9. When power is supplied to the shaft 43 the gear 68 will rotate in the direction of the arrow 78 as shown in FIGS. 5 and 9 to in turn rotate the gear 69 in an opposite direction. Since the gear 69 is in meshing engagement with the rack 67 the hood 52 pivots about the shaft 29 until the side plates 54 and 56 engage the stops 62 and 63. The spring 77 acting in tension maintains the gear 69 in meshing engagement with the rack 67. When the hood 52 has reached its open position, as determined by the stops 62 and 63, the gear 69 runs off the lower edge of the rack 67 thereby disconnecting the drive connection between the hood 52 and the drive shaft 43.

The hood 52 is held in the open position by an inwardly extended finger 79 secured to the upright lever member 72. As shown in FIG. 7, the finger 79 extends through a hole 81 in the side plate 54 thereby positively locking the hood in the open position. The spring 77 which biases the lever members 72 and 73 toward the hood 52 holds the finger 79 in the locked position.

After the bulk material in the box 24 has been unloaded the hood 52 is moved to the closed position by applying a pulling force on the cable 64. As shown in FIG. 6, the cable 64 extends through openings in the upper end sections of the members 72 and 73 and through an outwardly extended arm 82 secured to the side wall of the box 24. The arm 82 is positioned between the members 72 and 73 and has a hole 83 in its outer end section for accommodating the cable 64.

As shown in FIG. 8, the arm 82 has a length such that when a pulling force is applied to the cable 64 in the direction indicated by the arrow the upper ends of the members 72 and 73 are moved away from the box 24 against the biasing action of the spring 77. This outward movement of the members 72 and 73 removes the finger 79 from the hole 81 thereby releasing the hood 52 and as shown in FIG. 9 moves the gear 69 out of meshing engagement with the rack 67. With the gear 69 free of the rack 67, and the finger 79 free of the hole 81, the hood 52 is released for movement by the cable 64 to its closed or end gate position. When the hood 52 is in the closed position the pulling force on the cable 64 is moved with the result that the spring 77 will bias the members 72 and 73 toward the box 24 to hold the gear 69 in meshing engagement with the rack 67. Upon application of a drive force to the shaft 43 the drive mechanism 66 will be operated to automatically move the hood 52 to the open position as shown in FIG. 5.

In the use and operation of the bulk material spreader machine 20 the hood 52 is moved to the closed position and the box 24 is filled with bulk material, such as barnyard manure or commercial fertilizer. The spreader vehicle is then towed by a tractor into the field or place where it is desired to spread the bulk material. The tractor operator manually connects the conveyer drive and tractor power take-off and proceeds down the field. With the initial power supplied to the drive shaft 43 the drive mechanism 66 functions to automatically move the hood 52 to the open position as shown in FIG. 3. When the finger 79 is in the hole 81 the hood is locked in the open position.

The concurrent operation of the conveyer unit 26 and the flail assembly 28 moves the bulk material in the box 24 toward the rear of the box where it is beaten and flailed by the hammer units 32 which move downwardly into and away from the material. The hood 52 being initially spaced forward of the flail assembly 28 functions as a gate to prevent the material from being positioned initially in the area of the moving hammer units 28 and thereby prevents an initial discharge of a relatively large amount of bulk material onto the ground. After the hood 52 is moved to the open position the bulk material in the box 24 is moved by the conveyer unit 26 into engagement with the rotating hammer units 32 with the result that the material is cut and chopped into fine portions and evenly spread in a uniform pattern on the surface of the ground immediately behind the machine.

Referring to FIGS. 10 to 15, there is shown a conventional flail type bulk material spreader 84, commercially known as the flail type manure spreader No. 203PTO manufactured by New Idea, Coldwater, Ohio. The spreader 84 has an open-type rectangular-shaped box 86 mounted on a frame 87. The box and frame are supported above the ground by a wheel and axle assembly 88. The bulk material positioned in the box 82 is moved in a rearward direction by a conveyer unit 89 positioned in the bottom of the box and extended around under the frame 87. Guides 91 supported on the frame 87 maintain the conveyer unit 89 in alignment with and under the box 86.

Rotatably mounted on the back section of the box 89 is a flail assembly 92 comprising a transverse shaft 93 carrying a plurality of pivotally mounted and radially extended hammer units 94.

Secured to the top of the rear section of the box 86 is a shield 96 covering the top sector of the flail assembly 92. The shield 96 functions as a deflector to direct downwardly any material that may be thrown upwardly by the moving flail assembly.

The flail assembly 92 is driven from the power take-off of the tractor which pulls the spreader. Power from the tractor is transmitted through a drive shaft 97 which rotates in the direction of the arrow 98. The drive shaft 97 is rotatably mounted on a side wall of the box 86 and is connected to a power transmission 98 operable to simultaneously drive the flail assembly 92 and the conveyer unit 89.

Figure 10:
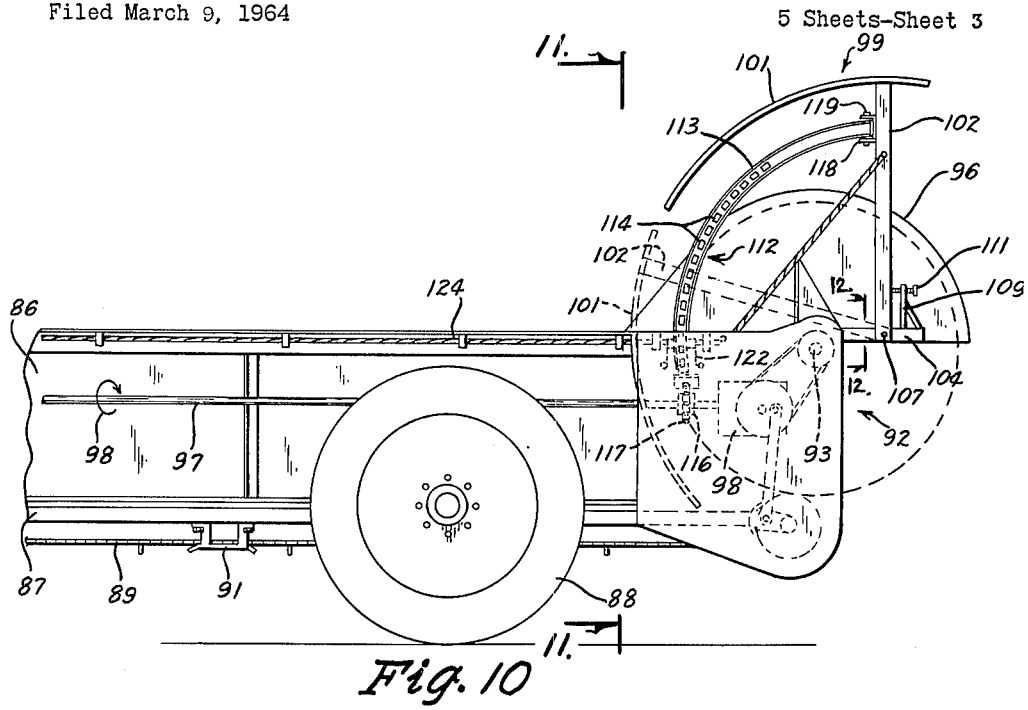
FIG. 10 is a fragmentary side view of a flail spreader equipped with a rear end gate attachment.

Mounted on the rear section of the box 89 adjacent the shield 96 is an end gate attachment indicated generally at 99. As shown in FIG. 10, the end gate attachment 99 is positionable in an open position as shown in full lines or in a closed position as shown in broken lines. The attachment 99 comprises a curved plate 101 having a width substantially equal to the inside lateral dimension of the box 86 and a height which is greater than the height of the box.

Figure 11:
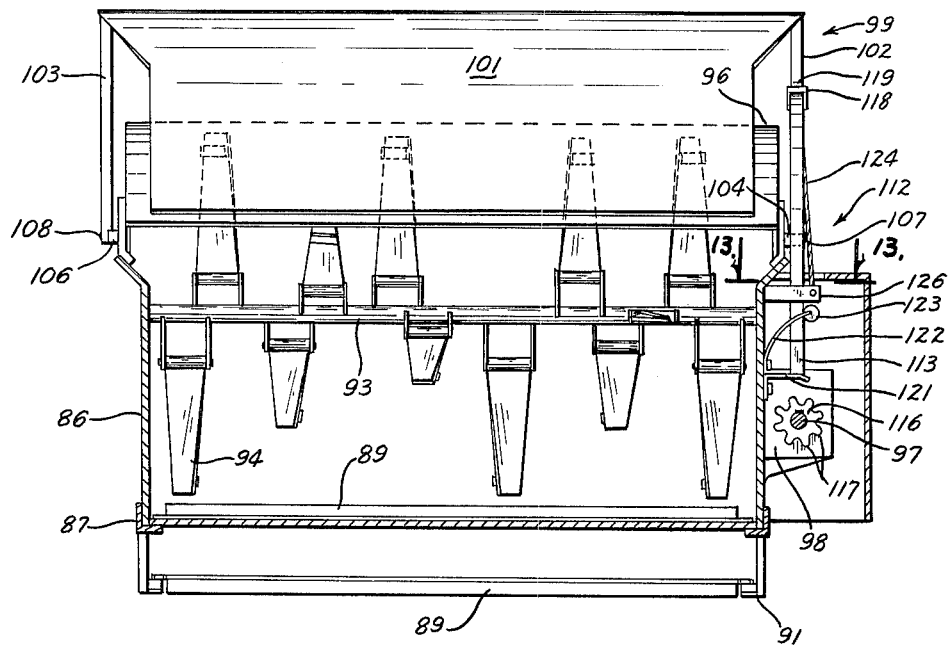
FIG. 11 is a sectional view taken along the line 11—11 of FIG. 10 showing the open position of the rear end gate attachment.
Figure 12:
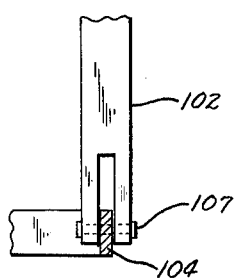
FIG. 12 is an enlarged sectional view taken along the line 12—12 of FIG. 10.

Secured to the outside portions of the upper section of the plate 101 are a pair of tubular arms 102 and 103 which extend adjacent the opposite sides of the shield 96 as shown in FIG. 11. The lower end sections of the arms 102 and 103 have diametrical slots to accommodate rearwardly extended flat beams 104 and 106 (FIG. 11) secured to and extended rearwardly from the side walls of the box 89 as shown for the beam 104 in FIGS. 10 and 12. Pins 107 and 108 (FIG. 11) pivotally mount the arms 102 and 103 on the beams 104 and 106, respectively, rearwardly of the shaft 93. The length of the arms 102 and 103 from the pivot pins 107 and 108 to the plate 101 is shorter than the radius of curvature of the plate 101 so that upon upward pivotal movement of the plate 101 the pressure of bulk material in the box is relieved from the plate 101.

As shown in FIG. 10, an upwardly projected member 109 is secured to the rear section of the beam 104 and carries a set screw 111 engageable with the arm 102. The set screw functions as an adjustable limit stop for the arm 102 when the end gate attachment is in the open position.

The plate 101 is moved from a closed position, shown in broken lines in FIG. 10, to the open position shown in full lines, by a drive mechanism indicated generally at 112 comprising an arcuate-shaped beam 113 having a plurality of evenly spaced holes 144 along the length thereof and a drive gear 116 rotatable with the shaft 97 but having limited axial movement relative thereto. The beam 113 is of a curvature such that on pivotal movement thereof about the pin 107 the teeth 117 on the gear 116 coact with the holes 114 to move the beam 113 in an upward direction. The limited axial movement of the gear 116 on the shaft 97 acts to maintain the teeth 117 in alignment with the holes 114. A U-shaped bracket 118 secured to the upper end section of the arm 102 carries a pin 119 which pivotally connects the upper end of the beam 113 to the bracket 118. The connection between the beam 113 and the pin 119 is a relatively loose fit to permit the beam to swing in a lateral direction.

As shown in FIG. 11, the lower end of the beam 113 is positioned on a laterally extended angle bracket 121 secured to a side wall of the box 86. The lower end section of the beam 113 is biased toward the box 86 by a U-shaped cantilever-type of spring 122 which has the free ends of its legs secured to the box 86 and the base thereof extended about the beam 113. A roller 123 is carried on the base of the spring 122 and engages the outside portion of the beam 113. It is seen, therefore, that the beam 113 and angle bracket 121 cooperate with the spring 122 to form a latch for the plate 101 to hold it in an open position as shown in FIGS. 10 and 11.

Figure 13:
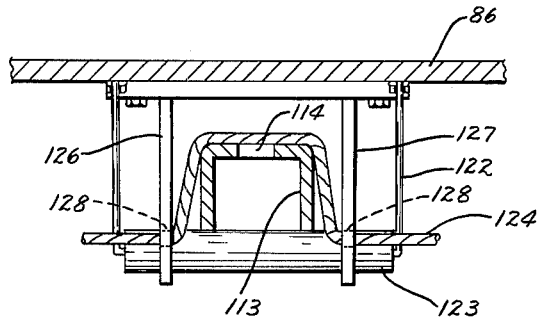
FIG. 13 is an enlarged sectional view taken along the line 13—13 of FIG. 11.
Figure 14:
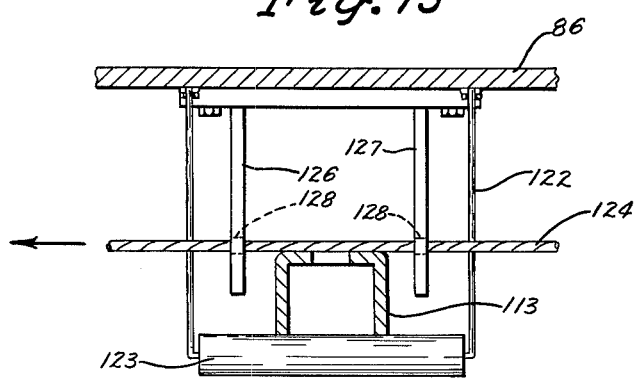
FIG. 14 is a sectional view similar to FIG. 13 showing the release position of the drive mechanism.

The end gate plate 101 is manually moved to a closed position indicated by broken lines in FIG. 10 by applying a pulling force on a cable or rope 124 having one end positioned on the tractor for towing the spreader and its other end to the arm 102 adjacent the bracket 118. The cable 124 extends through a pair of laterally projected members 126 and 127 secured to the side wall of the box 86 above the angle bracket 121 (FIGS. 13 and 14). The outer end sections of the members 126 and 127 have holes 128 which accommodate the cable 124. The beam 113 is positioned between the members 126 and 127 so that the section of the beam formed with the holes 114 is biased into engagement with the cable 124 by the spring 122. The cable 124 will extend about the beam 113 as long as the cable 124 is loose.

Figure 15:
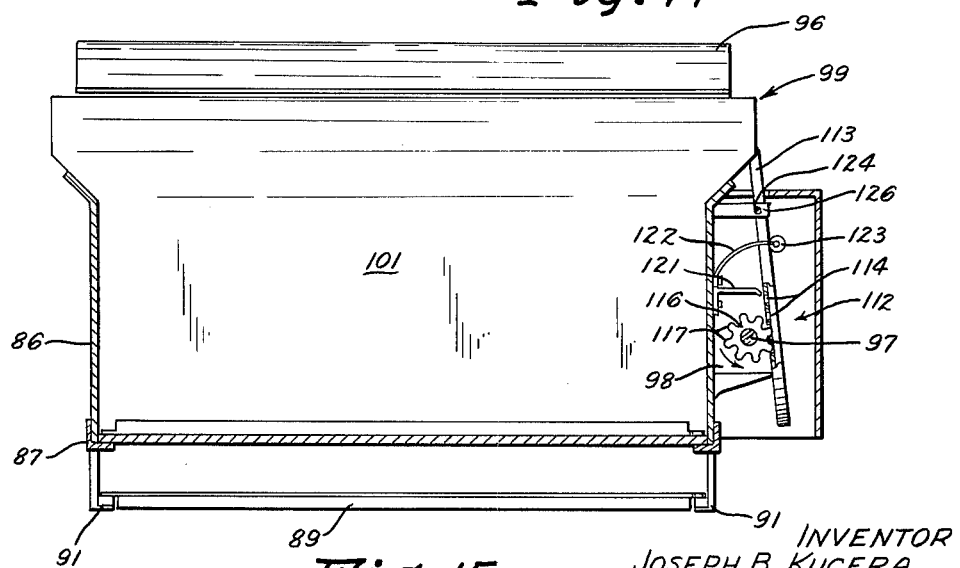
FIG. 15 is a sectional view similar to FIG. 11 showing the closed position of the rear end gate attachment.

As shown in FIGS. 14 and 15, when a pulling force is applied to the cable 124 from the tractor, the cable assumes a straight position which in turn forces the beam 113 in an outward direction against the biasing action of the spring 122. When the lower section of the beam is moved away from the angle bracket 121, the end gate plate 101 and its supporting arms 102 and 103 angularly move in a downward direction until the lower edge of the plate 101 rests on the bed of the box 86 as shown in FIG. 15. During the downward movement of the plate 101 the arcuate beam 113 is moved relative to the drive gear 116 with the teeth 117 thereof out of engagement with the beam 113.

When the pulling force on the cable 124 is released, the spring 122 biases the beam 113 into a driving relation with the gear 116. As shown in FIG. 15, the teeth 117 of the gear 116 are in meshing engagement with the holes 114 on the beam 113 when the end gate plate 101 is in the closed position. It is thus seen that as soon as the power is applied to the shaft 97 the gear 116 will move the beam 113 in an upward direction which in turn carries the plate 101 to its open position shown in FIG. 11.

Figure 16:
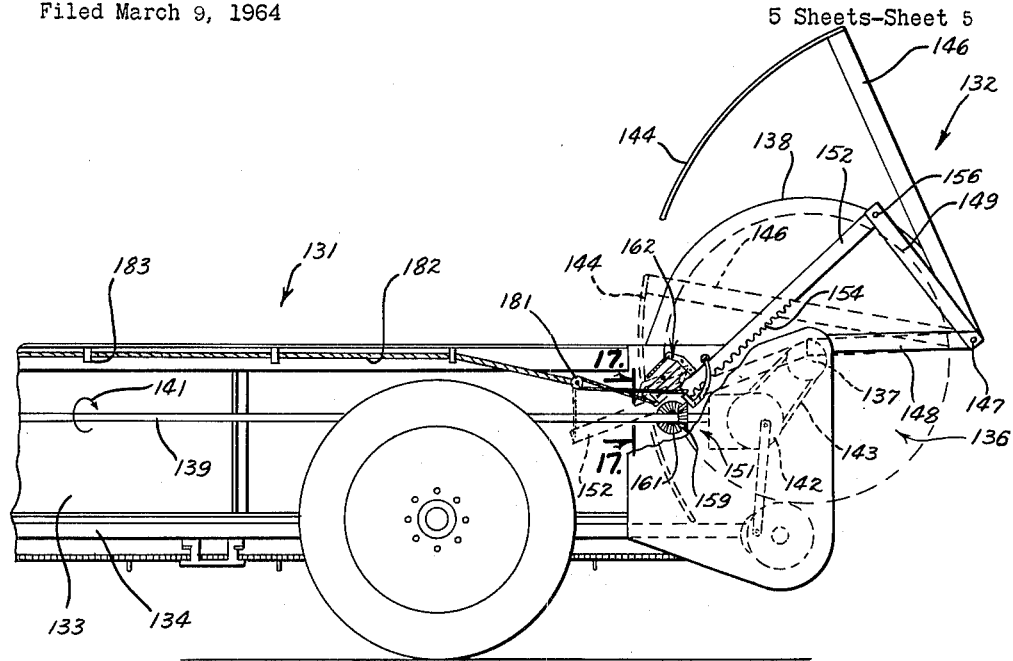
FIG. 16 is a fragmentary side view of a flail spreader equipped with a modified rear end gate attachment.

Referring to FIG. 16, there is shown a conventional flail type bulk spreader 131 equipped with a modified end gate attachment 132. The spreader 131 has an open-type rectangular-shaped box 133 mounted on a frame 134. Rotatably mounted on the back section of the box 133 is a beater assembly 136 comprising a transverse shaft 137 carrying a plurality of pivotally mounted and radially extended hammer units (not shown).

An arcuate-shaped shield 138 is positioned over the top sector of the beater assembly 136 and secured to opposite sides of the box 133. The shield 138 functions as a deflector to direct downwardly any bulk material that may be thrown upwardly by the moving beater assembly.

The beater assembly 136 is driven from the power take-off of the tractor used to tow the spreader. Power from the tractor is transmitted to a drive shaft 139 which rotates in the direction of the arrow 141. The drive shaft 139 is rotatably mounted on the side wall of the box 133 and is operatively connected to a power transmission 142. A chain and sprocket drive 143 completes the power train to the shaft 137 of the beater assembly.

The end gate attachment 132 is positionable above the arcuate shield 138, as shown in full line, to expose the bulk material in the box 133 to the cutting action of the beater assembly 136. As shown in broken lines, the end gate attachment 132 is positionable in the box 133 to form a door operative to hold the bulk material in the box 133 in a spaced relation with respect to the beater assembly 136. The end gate attachment 132 comprises a curved plate 144 having a width substantially equal to the inside lateral dimensions of the box 133 and a height which is greater than the depth of the box.

Secured to the outside portions of the upper section of the plate 144 are a pair of arms 146 (one of which is shown). The arms 146 extend rearwardly and downwardly and terminate adjacent the rear edge of the shield 138. The lower ends of the arms 146 are secured to a transverse shaft 147. The opposite end sections of the shaft 147 are rotatably supported on the ends of horizontal beams 148 secured to the rear end of the box 133 and the sides of the shield 138.

An upwardly extended lever 149 is attached to one end of the shaft 147 and forms therewith a crank. Angular movement of the lever 149 rotates the shaft 147 which in turn moves the plate 144 to its open and closed positions. The length of the arms 146 from the shaft 147 to the plate 144 is shorter than the radius of curvature of the plate 144 so that upon upward arcuate movement of the plate 144 the pressure of the bulk material in the box 133 on the plate 144 is relieved.

The plate 144 is moved from a closed position, shown in broken lines in FIG. 16, to the open position shown in full lines, by a drive mechanism indicated generally at 151 comprising a straight beam 152 and a gear 153. The beam 152 has teeth 154 on the bottom side thereof which coact with teeth in the gear 153 to drive the beam 152 in a rearward direction. A pin 156 pivotally connects the outer end of the lever 149 to the upper end of the beam 152.

Figures 17, 20:
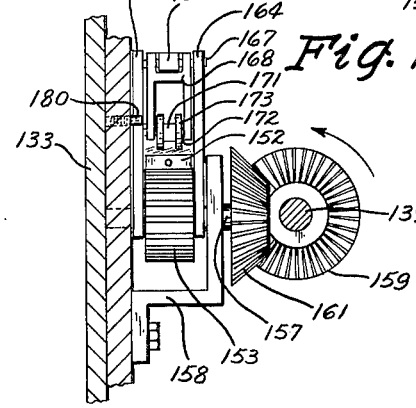
FIG. 17 is an enlarged sectional view taken along the line 17—17 of FIG. 16.
FIG. 20 is a view similar to FIG. 18 showing the rack and gear mechanism in the release position to permit the end gate to be moved to the closed position.

As shown in FIG. 17, the gear 153 is mounted on a shaft 157 extended laterally from the side wall of the box 133. A bracket 158 is secured to the side wall of the box 133 and rotatably carries the outer end of the shaft 157. The inner end of the shaft 157 is rotatably mounted on the side wall of the box 133. A pair of bevel gears 159 and 161 transmit power from the shaft 139 to the shaft 157. The gear 159 is carried by the shaft 139 and is in meshing engagement with the gear 161 which is carried on the outer end of the shaft 157.

Figures 18, 19:
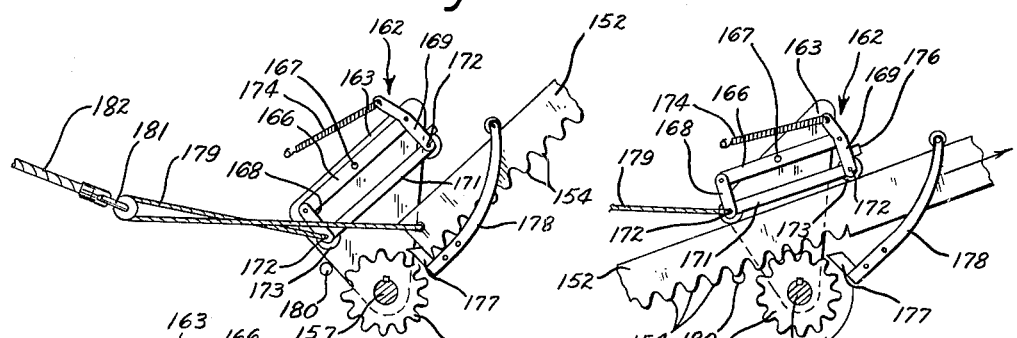
FIG. 18 is an enlarged side view of the rack and gear mechanism in the engaged position operable to move the end gate to the open position.
FIG. 19 is a view similar to FIG. 18 showing the rack and gear mechanism in the lock position holding the end gate in the open position.

As shown in FIG. 18, the teeth 154 on the beam 152 are maintained in meshing engagement with the gear 153 by a linkage indicated generally at 162. The linkage 162 comprises a pair of upright plates 163 and 164 journaled on the shaft 157 on opposite sides of the gear 153. A flat beam 166 positioned between the plates 163 and 164 is pivoted at its center section by a pin 167 to the plates.

A link 168 is pivotally connected to the forward end of the beam 166. A lever 169 is pivotally connected at its midsection to the opposite or rearward end of the beam 166. A beam 171 is pivotally connected at its opposite ends to the lower ends of the link 168 and the lever 169 by pins 172. Rollers 173 are carried by the pins 172 to reduce the friction between the top of the beam 152 and the linkage 162. A spring 174 is connected to the upper end of the lever 169 and at its opposite end to the box 133. The spring 174 extends in a forward direction from the lever 169 and biases the lower end of the lever 169 in a rearward direction against a stop 176 extended laterally from the box 133. A second stop 180 is secured to the side of the box 133 adjacent the forward edge of the plate 163. The spring 174 biases the plate 163 into engagement with the stop 180.

As shown in FIG. 19, the forward end of the beam 152 rests in an upright bracket 177 extended laterally from the box 133. The bracket 177 coacts with the beam 152 to lock the plate 144 in the open position as shown in full line in FIG. 16. A leaf-type spring 178 is secured to the bracket 177 and extends rearwardly engaging the top of the beam 152 biasing the beam 152 in a downward direction in locking engagement with the bracket 177.

The end gate plate 144 is manually moved to a closed position by applying a pulling force on a rope or cable 179. The opposite end sections of the cable 179 are secured to the link 168 and the end of the beam 152, respectively. The cable 179 passes through a pulley unit 181 connected to pull rope 182. As shown in FIG. 16, the rope 182 is threaded through ring members 183 attached to the side wall of the box 133. The forward end of the rope 182 is attached to the tractor so as to be readily accessible to the operator of the tractor.

As shown in FIG. 20, when a pulling force is applied to the cable 179 the beam 152 is moved in an upward direction out of engagement with the bracket 177. The rope 179 also applies pulling force to the linkage 162 moving it to a folded position against the biasing force of spring 174. With the linkage 162 in the folded position the beam 152 is moved out of engagement with the gear 153 and in a forward direction as shown by the arrow 184 thereby moving the end gate plate 144 to a closed position.

When the pulling force on the cable 179 is released, the spring 174 biases the linkage 162 in a rearward direction forcing the beam 152 into a driving relation with the gear 153. It is thus seen that as soon as the power is supplied to the drive shaft 139 the gear 153 will move the beam 152 in an upward and rearward direction which in turn angularly moves the lever 149 and rotates the shaft thereby carrying the plate 144 to its open position as shown in full lines in FIG. 16.

In summary, the bulk material unloading vehicle of this invention is equipped with a hood which is positionable in front of the beater assembly to function as an end gate preventing bulk material from being positioned in the working area of the beater assembly. When the drive is connected to the beater assembly, the drive mechanism for the hood moves the hood in an upward direction exposing the bulk material to the action of the moving beater assembly. The hood is held in an open position by a latch which also holds the drive mechanism in a disengaged position.

After the bulk material has been unloaded from the vehicle, the operator pulls on a cable to release the latch and move the hood to the closed position. When the hood is in the closed position the drive mechanism is returned to the engaged position.

While there have been shown and described the fundamental novel features of the invention, it is not to be so limited, as alterations and modifications may be made within the full intended scope of the invention as defined in the appended claims.

I claim:
1. In a spreader apparatus having a frame, a box supported on said frame, a beater assembly rotatably mounted on said frame adjacent the rear end of the box, conveyer means positioned in said box operable to move material longitudinally of said box into the beater assembly and drive means for operating said beater assembly and conveyor means,
    (a) hood means positioned about a sector of the beater assembly and rotatably supported on said frame, said hood means being movable to a first position adjacent the top sector of the beater assembly and movable to a second position into the box adjacent the forward sector of the beater assembly,
    (b) an arcuate-shaped rack means mounted on said hood means, and
    (c) gear means operably connected to the drive means and engageable with the rack means for moving the hood means from the second position to the first position.
2. The apparatus as defined in claim 1 including:
    (a) a drive gear in said gear means connected to the drive means,
    (b) a driven gear,
    (c) lever means for rotatably supporting said driven gear in meshing engagement with said drive gear, said lever means being movable to positions for holding the driven gear engaged with the rack means and disengaged from the rack means, and
    (d) spring means for urging the lever means to the position for holding the driven gear engaged with the rack means so that on the application of power to the drive means the rack means moves the hood means from the second position to the first position.
3. An end gate attachment for a spreader having a box, a transverse beater assembly rotatably mounted on the rear section of the box and drive means for said beater assembly comprising:
    (a) plate means for closing the end of the box adjacent the beater assembly,
    (b) arm means secured to the plate means and extended on opposite sides of the beater assembly,
    (c) means pivotally mounting the arm means to the box rearwardly of the axis of rotation of the beater assembly for movement about an axis extended substantially parallel to the axis of rotation of the beater assembly whereby said plate means is movable from a closed position within said box to an open position above said box,
    (d) an arcuate-shaped rack pivotally connected to said arm means,
    (e) a drive gear connected to the drive means,
    (f) spring means for biasing the rack into meshing engagement with the drive gear so that on the application of power to the drive means the rack moves the plate means from the closed position to the open position, and
    (g) lock means for holding the plate means in the open position.

References Cited by the Examiner

UNITED STATES PATENTS

| 696,643 | 4/1902 | Kinney | 275—3 |
| 842,238 | 1/1907 | Park | 275—5 |
| 865,182 | 9/1907 | Johnston | 275—5 |
| 2,876,014 | 3/1959 | Markel | 275—3 |

ABRAHAM G. STONE, *Primary Examiner.*

WILLIAM A. SMITH III, *Examiner.*